July 28, 1942.   L. A. LAURSEN   2,290,975

LEAK DETECTING PROCESS AND APPARATUS

Filed Aug. 3, 1940

INVENTOR.
Laurits A. Laursen
BY
Robbs Robb
ATTORNEYS

Patented July 28, 1942

2,290,975

UNITED STATES PATENT OFFICE 2,290,975

LEAK DETECTING PROCESS AND APPARATUS

Laurits A. Laursen, Copley, Ohio

Application August 3, 1940, Serial No. 350,354

7 Claims. (Cl. 73—51)

This invention relates to a method and apparatus for detecting leaks in a tire body or casing and, more particularly, for detecting leaks in a pneumatic tire body of the tubeless type.

Tire bodies or casings of pneumatic tires are formed largely of rubber and when a small puncture or opening occurs in the body of the tire, it is exceedingly difficult to find the location of the puncture which in most cases is practically invisible. In those cases where a separate inner tube is employed for holding the air within the tire casing, small openings or punctures in the tire casing are rather unimportant since the inner tube will be effective to hold air under pressure within the tire casing. However, in those cases where the tire casing is of the tubeless type, and is mounted directly on the wheel rim without the use of an inner tube, it is exceedingly important that small punctures be found and repaired in order that the tire will be able to hold air.

A principal object of this invention, in view of the foregoing, is to provide a novel method of detecting leaks and puncture points, in a tire body or casing, which method includes the steps of application of air or fluid under pressure to the outer surface of the tire casing or passage through the puncture or leak opening to provide an indication of the leakage point at the inner surface of the tire for the purpose mentioned.

Another object of this invention is to provide a novel method of detecting leaks in a pneumatic tire body or casing by the application of fluid or air under pressure to the outer surface of the tire casing so as to pass through any leakage opening or puncture, and additionally employing the tire casing as a receptacle for a medium which when affected by the fluid or air will give an indication of the point of passage of air through the tire wall and thus facilitate detection of the location of an opening or puncture in the tire.

A further object is to provide a novel form of apparatus for carrying out a method for detecting leaks in a tire casing of the tubeless type and which will facilitate the application of pressure to the outer surface of the tire.

In the drawing—

Figure 1:
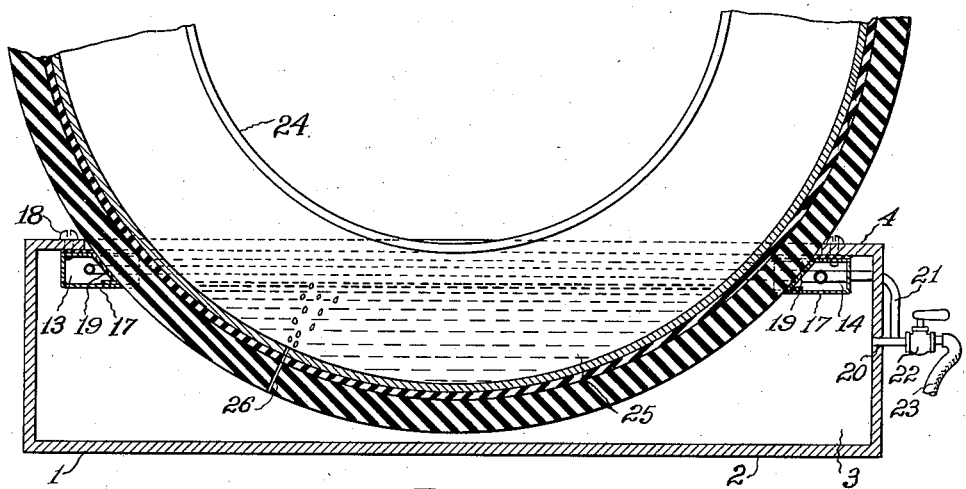
Figure 1 is a vertical longitudinal sectional view of the apparatus by which the pressure is applied to the outer surface of a tire casing and showing the position of a tire casing and the air leak detecting medium with respect to the apparatus.

In most cases where it is desired to detect an air leak in a rubber or similar container adapted to contain air under pressure, the container is merely filled with air and placed under water. The air escaping through a leak in the container will form bubbles of air which will be readily visible in the water and may be traced to the source of the leak. However, in the case of a tubeless tire or casing, it will be apparent that such a method of detecting leaks can not be readily employed when the tubeless tire is dismounted from the vehicle rim since of itself it is incapable of holding air, the inner periphery of the tire casing being open to the atmosphere. Accordingly, the method which I employ for locating leaks in a pneumatic vehicle tire casing involves the utilization of the interior of the tire as a receptacle for a leak detecting medium and the application of fluid pressure to the outside surface of the tire.

Referring now to the drawing wherein is illustrated a preferred form of apparatus for carrying out the principles of the invention, the numeral 1 indicates as a whole an elongated pressure receptacle 2 having a hollow interior 3 and a top 4. The top 4 is provided with an opening 5 extending longitudinally of the receptacle 2 which is adapted to be closed by a tire body or casing in a manner to be described.

Figure 2:
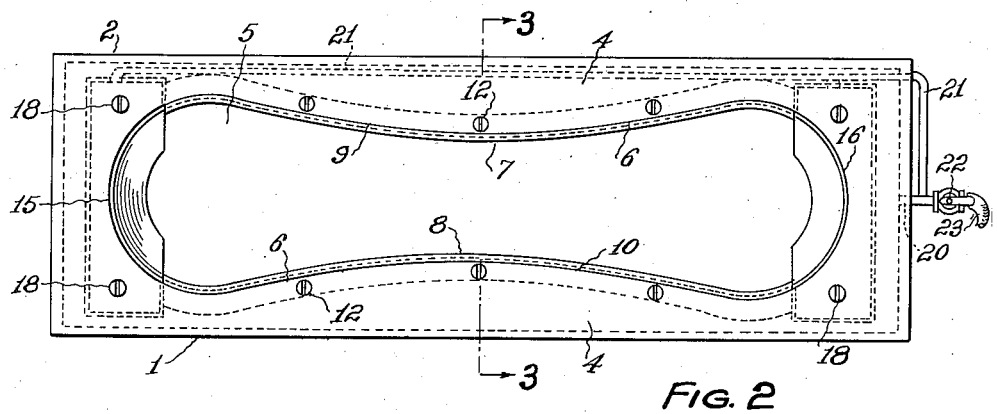
Figure 2 is a top plan view of the apparatus shown in Figure 1.

As best shown in Figure 2, the periphery 6 of the opening 5 is formed to coincide with the shape of the conventional type pneumatic tire. The periphery 6 is of an irregular contour and is made to coincide with the outer surface of a pneumatic tire body as defined by the intersection of the surface of the tire body with an imaginary segmental plane occupying a position parallel to the axis about which the tire body normally revolves. It will be apparent that the imaginary segmental plane referred to will also be the plane of the top 4 in which also lies the periphery 6 of the opening 5. By shaping the periphery 6 of the opening 5 in the manner referred to, the opening 5 may be readily closed by placing the outer surface of the tire in engagement with the edge of the periphery 6 defining the opening 5.

Figure 3:
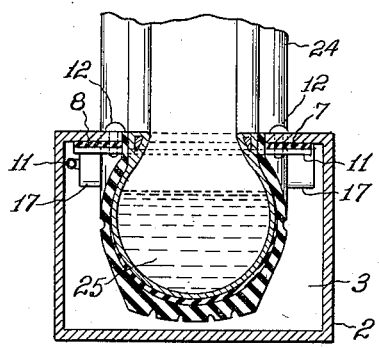
Figure 3 is a sectional view taken substantially on the line 3—3 of Figure 2 and showing in section the position of a tire casing with respect to the apparatus shown.

In order that the outer portion of the surface of the tire which is to be examined for punctures may be more effectively sealed off from the atmosphere, strips 7 and 8 of resilient rubber sealing material are respectively secured to opposite longitudinal edges 9 and 10 of the opening 5 and project slightly outwardly from such edges, as best shown in Figures 2 and 3, for engagement with the surface of the tire. The strips 7 and 8 are secured with respect to the top 4 of the receptacle 2 by means of clamping members 11 held in position by suitable fastening devices 12. The rubber strips 7 and 8 will contact the rubber on the tire and provide an effective seal for sealing the surface of the tire from the atmosphere and for holding air under pressure within the interior 3 of the receptacle 2. Obviously, the entire length of the periphery 6 may be lined with a strip of material similar to the strips 7 and 8 for providing such a seal along the entire edge of the surface of the tire to be examined for leaks. However, in such case, the portion of the strip contacting the tread portion would be formed of an irregular contour to compensate for the tread grooves formed in the tread portion of the tire casing.

For the purpose of providing a seal for the tread portion of the tire casing and capable of universal use with respect to various shaped treads, auxiliary pressure chambers 13 and 14 are respectively provided on opposite ends 15 and 16 of the opening 5. The pressure chambers 13 and 14 comprise casings 17 secured to the top 4 of the receptacle 2 by fastening devices 18. The casings 17 are open on the side adjacent the ends 15 and 16 of the opening 5 and are shaped to correspond to the general contour of the tread portion of the tire as best shown in Figure 2 to form a support for the tire. The open side of the casing 17 is covered by a flexible strip of rubber 19 suitably secured with respect to the body of the casing 17. Upon the admission of fluid pressure to the interior of the casing 17, the rubber strip 19 will be forced outwardly into engagement with the tread portion of the tire and the strip will be expanded into the grooves formed in the tread portion to seal the tread portion from the atmosphere in a manner to be described. It will be apparent that instead of securing a strip of rubber 19 to the casing 17, a rubber bag could be inserted within the casing 17 to serve the same purpose as the strip 19.

The interior 3 of the receptacle 2 and the pressure chambers 13 and 14 are respectively connected by pipes or conduits 20 and 21 to a valve 22. The valve 22 is connected by a conduit 23 to a suitable source of fluid pressure and is adapted to control the admission of air or other suitable fluid pressure from such source to the hollow interior 3 of the receptacle 2 and the auxiliary chambers 13 and 14.

In operation, the tire casing is placed within the opening 5 with the outer surface thereof in engagement with the sealing members along the periphery 6, as best shown in Figures 2 and 3, and the valve 22 is then operated to admit air under pressure to the interior 3 of the receptacle and auxiliary pressure chambers 13 and 14. Upon the admission of air to the auxiliary pressure chambers 13 and 14, the rubber strip 19 will be expanded to seal the tread grooves in the tread portion of the tire from the atmosphere and prevent the escape of air from the interior 3 of the receptacle 2, the strips 7 and 8 preforming a like operation with respect to the side walls of the tire.

For the purpose of enabling the operator to locate leaks in the tire casing 24, the interior 25 of the tire casing 24 is employed as a receptacle for a medium capable of indicating the passage of air from the outer surface of the tire 24 to the inner surface thereof. It is preferred that water be employed for this purpose and, in which case, the location of a leak 26 will readily be made apparent to the operator by the bubbles formed upon the escape of air into the water. In place of water, it is contemplated that a powder or other suitable substance may be readily employed for locating the position of punctures through which air may escape through the body of the tire.

From the foregoing, it will be apparent that there is provided a novel method for locating punctures in a tubeless tire or tire casing which has been dis-mounted from the vehicle wheel rim and which comprises the application of fluid under pressure to the outer surface of the tire and the utilization of the interior of the tire as a receptacle for a medium capable of indicating the passage of air through the body of the tire. The apparatus employed is useful in carrying out the method set forth in that it permits the sealing of that portion of the outer surface of the tire being examined for leaks from the atmosphere and provides an effective means for applying pressure to the outer surface of the tire.

It is within the scope of this invention to cause the application of a pressure fluid such as air or the like to the external surface of a tire casing by means of any confined fluid carrier which may consist of a receptacle such as designated 1 in the drawing, or a conduit such as a pipe, the open fluid exit end of which may be directly applied or contacted with the outer surface of the tire to cause the fluid passing therefrom to go through a leak or puncture opening that may pass through the tire from the outer surface to the inner surface.

Having thus described my invention, what I claim as new and desire to secure by Letters Patent of the United States is:

1. The method of detecting leaks in a tire body which comprises subjecting the outer surface of the tire to fluid under pressure, and placing a detecting medium on the inner surface of the tire body for indicating the passage of fluid through the body of said tire from said outer surface to the inner surface thereof.

2. The method of detecting leaks through invisible openings in a tire body which comprises subjecting the outer surface of the tire to fluid under pressure, and employing the interior of said tire as a receptacle for a detecting medium for making visible the passage of fluid through said openings.

3. The method of detecting leaks through invisible openings in a tire body which comprises subjecting the outer surface of the tire to air under pressure, sealing such surface from the atmosphere, and employing the interior of said tire as a receptacle for water to make visible the passage of air through said openings.

4. In apparatus for detecting leaks in a pneumatic tire body, a hollow receptacle having an opening therein, the periphery of said opening being shaped to correspond with the outer surface of the tire as defined by its intersection with a segmental plane whereby said opening may be closed by the outer surface of said tire, and means for admitting fluid pressure to the interior of said receptacle.

5. In apparatus for detecting leaks in a pneumatic tire body, a hollow receptacle having a substantially flat top provided with an opening to receive a portion of said tire below a segmental plane parallel to the axis of the tire and including the plane of the top of the receptacle, the opening thus defined corresponding to the outer surface of the tire, means to seal the space between the opening and the surface of the tire, and means for admitting fluid pressure to the interior of said receptacle.

6. Apparatus as claimed in claim 5, wherein the periphery of said opening is provided with an elastic sealing material secured to the body of said receptacle and adapted for sealing engagement with the outer surface of the tire.

7. Apparatus as claimed in claim 5 wherein opposite ends of said opening are provided with auxiliary pressure chambers for receiving fluid under pressure, said chambers having elastic material provided in the walls thereof adapted to be forced by fluid under pressure into the tire tread grooves to prevent the escape of fluid under pressure from said receptacle.

LAURITS A. LAURSEN.